US009287771B2

(12) United States Patent
Hatanaka et al.

(10) Patent No.: US 9,287,771 B2
(45) Date of Patent: Mar. 15, 2016

(54) SERIES REGULATOR ON ELECTRONIC CONTROL UNIT FOR AUTOMOTIVE VEHICLE

(75) Inventors: Ayumu Hatanaka, Naka (JP); Takuya Mayuzumi, Hitachinaka (JP); Chihiro Sato, Kasama (JP); Yoshitaka Abe, Hitachinaka (JP); Daisuke Sekine, Hitachinaka (JP); Hirofumi Kurimoto, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 782 days.

(21) Appl. No.: 13/570,726

(22) Filed: Aug. 9, 2012

(65) Prior Publication Data

US 2013/0049459 A1 Feb. 28, 2013

(30) Foreign Application Priority Data

Aug. 30, 2011 (JP) ................................. 2011-186722

(51) Int. Cl.
*H02M 3/155* (2006.01)
(52) U.S. Cl.
CPC ..................................... *H02M 3/155* (2013.01)
(58) Field of Classification Search
CPC ....... H02M 3/00; H02M 3/155; H02M 3/156; H02M 7/00; B60L 1/00; G05F 1/40
USPC ..................... 307/10.1, 9.1; 323/282; 363/125
See application file for complete search history.

(56) References Cited

U.S. PATENT DOCUMENTS

| 5,734,205 | A | * | 3/1998 | Okamura et al. | 307/110 |
| 5,969,547 | A | * | 10/1999 | Pernyeszi | 327/73 |
| 7,586,296 | B2 | * | 9/2009 | Kanayama | 323/282 |
| 2002/0047639 | A1 | * | 4/2002 | Okuchi et al. | 315/307 |
| 2008/0061628 | A1 | * | 3/2008 | Nielsen et al. | 307/66 |
| 2008/0284389 | A1 | * | 11/2008 | Kawase et al. | 323/266 |
| 2010/0019808 | A1 | * | 1/2010 | Fuma et al. | 327/109 |
| 2010/0213904 | A1 | * | 8/2010 | Yamada | 320/166 |
| 2010/0223995 | A1 | * | 9/2010 | Watanabe | 73/431 |

FOREIGN PATENT DOCUMENTS

| CN | 101542903 A | 9/2009 |
| JP | H08-317633 A | 11/1996 |

(Continued)

OTHER PUBLICATIONS

Circuit Analysis Basics; Electric Circuit Experiment Textbook Series; pp. 116-117; Sep. 30, 2008; University of Electronic Science and Technology of China.

*Primary Examiner* — Jared Fureman
*Assistant Examiner* — Michael Warmflash
(74) *Attorney, Agent, or Firm* — Foley & Lardner LLP

(57) ABSTRACT

A capacitor connected to a microcomputer voltage wiring is downsized. A series regulator on an electronic control unit for automotive includes a battery as an in-vehicle power supply, a relay, an input side capacitor, a series regulator circuit, and an output side capacitor, and is connected to a microcomputer. The series regulator circuit includes an n-channel MOSFET, a gate voltage regulator circuit as an output control circuit of an FET, and a gate voltage holding capacitor. A capacitor GND voltage (gate voltage) is adjusted by the gate voltage regulator circuit to convert an input side capacitor voltage into an output side capacitor voltage, and supply a microcomputer current to the microcomputer.

9 Claims, 11 Drawing Sheets

(56) References Cited

FOREIGN PATENT DOCUMENTS

| JP | 10-157923 | 6/1998 |
| JP | H11-85328 A | 3/1999 |
| JP | 2000-272550 A | 10/2000 |
| JP | 2008-289254 A | 11/2008 |

* cited by examiner

SERIES REGULATOR ON ELECTRONIC CONTROL UNIT FOR AUTOMOTIVE VEHICLE

CROSS-REFERENCE TO RELATED PATENT APPLICATIONS

Japan Priority Application 2011-186722, filed Aug. 30, 2011 including the specification, drawings, claims and abstract, is incorporated herein by reference in its entirety.

FIELD OF THE INVENTION

The present invention relates to a series regulator on an electronic control unit for automotive, and an electronic control unit for automotive mounting the series regulator thereon.

BACKGROUND OF THE INVENTION

In recent years, in a series regulator on an electronic control unit for automotive, a large-capacity electrolytic capacitor has been required for the purpose of supplying an electric power to a microcomputer during a period when a flash-ROM mounted microcomputer (microcomputer) for controlling an in-vehicle device writes information required for a subsequent start in the flash-ROM after a power supply from an in-vehicle power supply (battery, etc.) has been cut off. An event where the power supply from the in-vehicle power supply is cut off occurs in a rapid drop in a voltage of the in-vehicle power supply when a load large in power consumption starts, a disconnection, or a case where a relay controlled according to the operation of an ignition switch turns off for some reasons.

When it is detected that the operating voltage of the microcomputer drops due to a relay off or the disconnection, the microcomputer shifts to a standby state after a period required for writing in the flash-ROM. There is a need to continuously supply a given current to the microcomputer with a given operating voltage until the microcomputer shifts to the standby state. For that reason, measures are taken to increase the capacitance of the capacitor connected to an input terminal of the microcomputer.

In order to supply an operating current 400 [mA] to the microcomputer with a voltage change ($\Delta V=0.3[V]$) of an operating voltage lower limit 3.0[V] from a normal operating voltage 3.3[V] of the microcomputer during a period of 140 [us] until the microcomputer shifts to the standby state, a large capacitance of C=400 [mA]÷0.3[V]×[us]=180 [uF] or more has been required. In order to realize this large capacitance, a large-sized electrolytic capacitor or a secondary battery has been required. The former is inept in downsizing, and the latter suffers from an increase in the costs.

As a method for solving the above problem, there is proposed a method disclosed in, for example, Japanese Unexamined Patent Application Publication No. 2008-289254. In the method disclosed in the publication, an external voltage is monitored to detect a voltage drop with the results that, as compared with a case in which a microcomputer voltage is monitored, a reset response of the microcomputer is improved to avoid an indefinite operation of the microcomputer without any increase in the capacitance of the capacitor.

SUMMARY OF THE INVENTION

However, when there is a need to ensure the microcomputer operation till a low external voltage, even with a configuration in which the external voltage is monitored to output a reset signal as described above, a determination value of the reset signal output must be set to be lower to make it difficult to improve the reset response. For that reason, in the end, there is a need to increase the capacitance of the capacitor to be connected to the input terminal of the microcomputer, and an increase in the mounting area and an increase in the costs cannot be avoided, which are problematic.

The present invention has been made to solve the above problems, and therefore an object of the present invention is to provide a series regulator on an electronic control unit for automotive for supplying the operating voltage to the microcomputer, in which when a voltage to be supplied from the in-vehicle power supply such as a battery decreases due to the relay off or the disconnection, the microcomputer can be normally shifted to the standby state even in a configuration where the capacitance of the capacitor to be connected to the input terminal of the microcomputer is small.

In order to address the above problem, according to one aspect of the present invention, there is provided a series regulator on an electronic control unit for automotive which is connected to an in-vehicle power supply for supplying a voltage to a microcomputer, the series regulator including: a first capacitor that has one end connected to a positive electrode of the in-vehicle power supply and the other end connected to a negative electrode of the in-vehicle power supply; a second capacitor that has one end connected to an input terminal of the microcomputer and the other end connected to the negative electrode of the in-vehicle power supply; a transistor that has an input terminal connected to the one end of the first capacitor and an output terminal connected to the input terminal of the microcomputer; a resistive element that has one end connected to an output control terminal of the transistor; a third capacitor that has one end connected to the other end of the resistive element and the other end connected to the negative electrode of the in-vehicle power supply; and an output control circuit that has an output connected between the output control terminal of the transistor and the resistive element, and controls driving of the transistor, in which the microcomputer includes a stop processor that that stores information required for a subsequent start when a voltage applied between both ends of the first capacitor falls below a given voltage.

Also, the transistor is an n-channel MOSFET having a drain terminal as the input terminal, a source terminal as the output terminal, and a gate terminal as the output control terminal.

According to the aspect of the present invention, when the voltage applied from the in-vehicle power supply such as a battery decreases due to the relay off or the disconnection, the microcomputer can normally shift to the standby state even in a configuration where the capacitance of the capacitor connected to the input terminal of the microcomputer is small. As a result, the downsizing of the electronic control unit for automotive and a reduction in the costs can be realized.

DETAILED DESCRIPTION OF THE PREFERRED EMBODIMENTS

Figure 1:
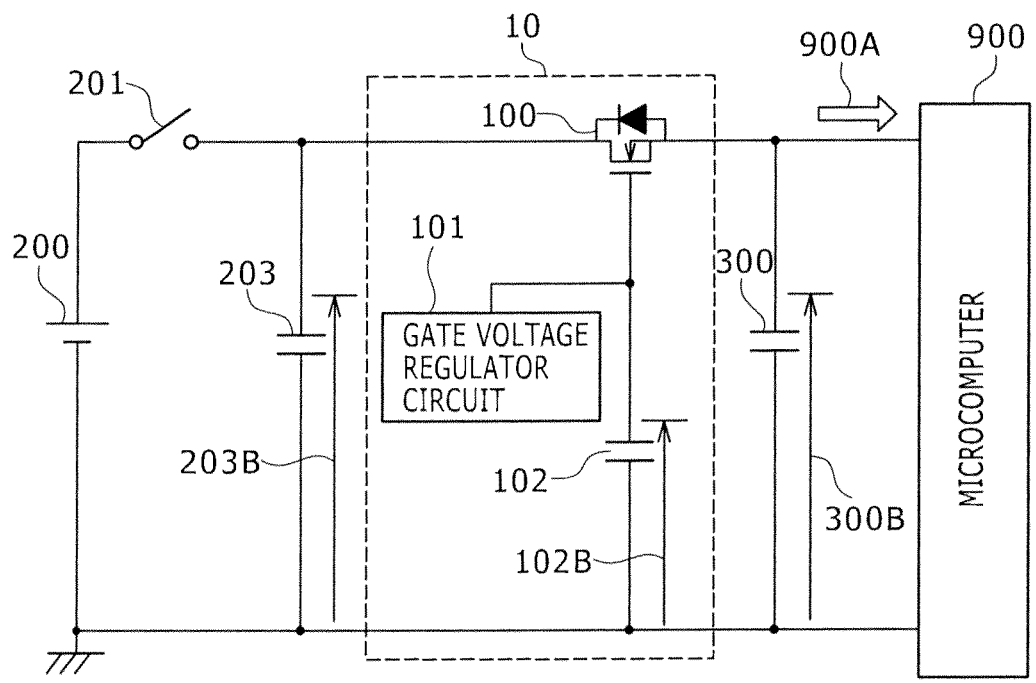
FIG. 1 is a diagram illustrating a series regulator on an electronic control unit for automotive according to a first embodiment.

An series regulator on an electronic control unit for automotive according to the present invention includes an in-vehicle power supply, a first capacitor, a second capacitor, a transistor, a microcomputer, and an output control circuit that controls driving of the transistor. One end of the first capacitor is connected to a positive electrode of the in-vehicle power supply and the other end of the first capacitor is connected to a negative electrode of the in-vehicle power supply. One end of the second capacitor is connected to an input terminal of the microcomputer, and the other end of the second capacitor is connected to the negative electrode of the in-vehicle power supply. An input terminal of the transistor is connected to a positive electrode of the in-vehicle power supply, and an output terminal of the transistor is connected to the input terminal of the microcomputer. An output control terminal of the transistor is connected to the third capacitor, and the end of the third capacitor is connected to the negative electrode of the in-vehicle power supply. An output of the output control circuit is connected to the output control terminal of the transistor. With the above configuration, even after the in-vehicle power supply is cut off, the voltage at the output control terminal of the transistor, and a control current are held for a long time. As a result, even after the in-vehicle power supply is cut off, the transistor can convert the voltage accumulated in the first capacitor into the microcomputer voltage, and continue to apply the voltage to the microcomputer, and the capacitance of the second capacitor connected to the input terminal of the microcomputer can be reduced.

Also, a first diode is connected in series between the positive electrode of the in-vehicle power supply and the one end of the first capacitor, an anode of the first diode is connected to the positive electrode of the in-vehicle power supply, and a cathode of the first diode is connected to the positive electrode of the first capacitor. With the above configuration, even if the in-vehicle power supply is short-circuited, or a negative voltage surge occurs due to an external load, the microcomputer can be stably shifted to a standby state.

Also, a first resistive element is connected in series between the output control terminal of the transistor and the third capacitor, one end of the first resistive element is connected to the output control terminal of the transistor, and the other end of the first resistive element is connected to the positive electrode of the third capacitor. With the above configuration, a current charged in or discharged from the third capacitor can be suppressed when a current and a voltage output from the output control circuit are changed. As a result, the response of the current flowing in the output control terminal of the transistor and the voltage at the output control terminal can be improved.

Also, a fourth capacitor is connected in parallel to the first resistive element, a positive electrode of the fourth capacitor is connected to the one end of the first resistive element, and a negative electrode of the fourth capacitor is connected to the other end of the first resistive element. With the above configuration, even if the surge is supplied to an output signal of the output control circuit, the fourth capacitor absorbs the surge so as to prevent unnecessary operation of the transistor.

Also, there is provided a current limit signal output circuit, and an output of the current limit signal output circuit is connected to an output control terminal of the transistor. With the above configuration, the wiring on the microcomputer side can be prevented from being short-circuited to allow an excessive current to flow, and failing.

Also, the in-vehicle power supply includes a battery and a relay switch, a switching regulator is disposed between the in-vehicle power supply and the first capacitor, the relay switch is connected to the positive electrode of the battery, an input terminal of the switching regulator is connected to the positive electrode of the in-vehicle power supply, and an output terminal of the switching regulator is connected to the positive electrode of the first capacitor. The switching regulator converts a first voltage output by the battery into a second voltage.

Also, the transistor is formed of an n-channel MOSFET with a drain terminal as the input terminal, a source terminal as the output terminal, and a gate terminal as the output control terminal. With the above configuration, even if the surge is supplied to an output signal of the n-channel MOSFET, no voltage fluctuation occurs between the gate terminal and the source terminal. For that reason, the n-channel MOSFET can prevent the surge voltage from being applied to the microcomputer without any unnecessary operation such as turn-on. Also, because the MOSFET is a voltage-driven semiconductor element, there is no need to allow a current to continuously flow during driving, and a gate drive loss can be suppressed.

Also, at least a part of the circuit is incorporated into a semiconductor integrated circuit, thereby enabling downsizing.

Also, in the present invention, with the provision of the series regulator on an electronic control unit for automotive described below, there can be provided a downsized electronic control unit for automotive that can reduce the capacitance of the second capacitor Also, at least a part of the components in the electronic control unit for automotive is sealed with resin, thereby enabling high-density package of the electronic control unit for automotive.

Hereinafter, specific embodiments of the present invention will be described below.

First Embodiment

Hereinafter, a description will be given in detail of a series regulator on an electronic control unit for automotive according to a first embodiment of the present invention with reference to FIGS. 1 and 2. FIG. 1 is a circuit configuration diagram of the series regulator on an electronic control unit for automotive according to the first embodiment, which illustrates a power supply circuit for one load.

The series regulator on an electronic control unit for automotive includes a battery 200 as an in-vehicle power supply, a relay 201, an input side capacitor 203, a series regulator circuit 10, and an output side capacitor 300, and is connected to a microcomputer 900.

The series regulator circuit 10 includes an n-channel MOSFET 100, a gate voltage regulator circuit 101 as an output control circuit of an FET, and a gate voltage holding capacitor 102. A capacitor to GND voltage (gate voltage) 102B is regulated by the gate voltage regulator circuit 101 to convert an input side capacitor voltage 203B into an output side capacitor voltage 300B, and a microcomputer current 900A is supplied to the microcomputer.

In the microcomputer 900 according to this embodiment, it is assumed that an operating voltage is Vmv, an operable voltage range thereof is ΔVmv, an operating current is Im, and a period since stop processing ready for a subsequent start is started until the microcomputer shifts to a standby state is Tsby. Also, it is assumed that a voltage of the battery 200 is VB, a capacitance of the input side capacitor 203 is Cin, a capacitance of the output side capacitor 300 is Cout, and a capacitance of the gate voltage holding capacitor 102 is Cgg.

Hereinafter, the operation according to the first embodiment will be described with reference to waveforms of the input side capacitor voltage 203B, the output side capacitor voltage 300B, the capacitor to GND voltage 102B, and the microcomputer current 900A illustrated in FIG. 2.

Figure 2:
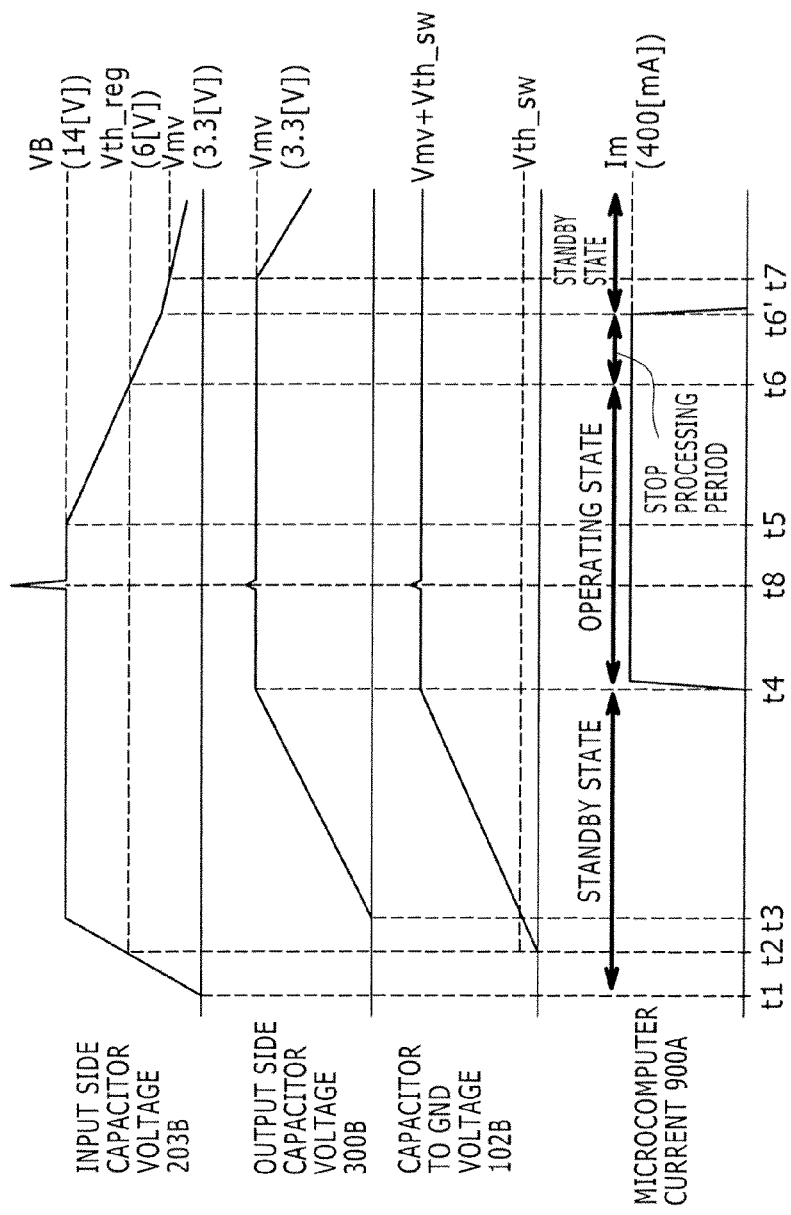
FIG. 2 is a diagram illustrating current and voltage waveforms according to the first embodiment.

At a time t1 of FIG. 2, the relay 201 turns on, and the input side capacitor voltage 203B starts to increase. From a time t2 when the input side capacitor voltage 203B exceeds a given voltage value Vth_reg, the gate voltage regulator circuit 101 starts to operate, and the capacitor to GND voltage 102B starts to increase. From a time t3 when a voltage difference between the output side capacitor voltage 300B and the capacitor to GND voltage 102B becomes a gate threshold voltage Vth_sw or higher of the n-channel MOSFET 100, the output side capacitor voltage 300B starts to increase. After the input side capacitor voltage 203B has arrived at a battery voltage VB, the input side capacitor voltage 203B holds VB.

At a time t4, when the output side capacitor voltage 300B arrives at the operating voltage Vmv of the microcomputer, the microcomputer current 900A starts energization, and the gate voltage regulator circuit 101 operates so that a capacitor to GND voltage is held constant. In this situation, the output side capacitor voltage 300B is substantially a sum of the operating voltage Vmv of the microcomputer and the gate threshold voltage Vth_sw. As a result, Vmv is held constant while the microcomputer obtains a desired current.

At a time t5, the relay 201 turns off, and the input side capacitor voltage 203B starts to decrease. In this situation, the input side capacitor voltage 203B is gently decreased by electric charge stored in the input side capacitor 203, and a voltage equal to or higher than the operating voltage Vmv of the microcomputer can be output.

At a time t6, when the input side capacitor voltage 203B becomes the given voltage value Vth_reg or lower, the gate voltage regulator circuit 101 stops to operate, and the microcomputer 900 starts the stop processing ready for the subsequent start. The capacitor to GND voltage 102B is gently decreased by the capacitance Cgg of the gate voltage holding capacitor 102, and a time constant (τ=Cgg×Rcgg) determined according to an insulating resistive component Rcgg between the positive electrode and GND because the electric charge is stored in the gate voltage holding capacitor 102. In this situation, it is assumed that the time constant τ is a sufficiently large value as compared with Tsby. Even if the battery voltage VB is cut off by the gate voltage holding capacitor 102, the n-channel MOSFET 100 can be continuously operated.

At a time t6', the microcomputer completes the stop processing ready for the subsequent start, more particularly processing of writing information required for the subsequent start in the flash-ROM, and comes to the standby state. The microcomputer current 900A decreases toward 0 [A]. When the microcomputer comes to the standby state, discharge from the input side capacitor 203 mainly includes fine leak current, and therefore a voltage drop of the input side capacitor voltage 203B becomes gentle.

At a time t7, the input side capacitor voltage 203B becomes equal to the output side capacitor voltage 300B, and thereafter the output side capacitor voltage 300B starts to drop with the same slope as that of the input side capacitor voltage 203B.

Hereinafter, a calculation example will be described in the case of Vmv=3.3[V], ΔVmv=0.3[V], Im=400 [mA] Tsby=140 [us], VB=14[V], Cin=20 [uF], Cout=20 [uF], Cgg=1 [uF], Rcgg=1 [MΩ], and Vth_reg=6[V].

The time constant τ becomes =Cgg (1 [uF])×Rcgg (1 [MΩ])=1 [s]. Because of Tsby=140 [us], the time constant τ can be regarded as a sufficiently long time as compared with tsby, and a decrease in the capacitor to GND voltage 102B after Tsby has been elapsed can be ignored. For that reason, the n-channel MOSFET 100 operates so that the output side capacitor voltage 300B becomes Vmv even after the operation of the gate voltage regulator circuit 101 has stopped after the time t6.

When the amount of electric charge necessary in the period Tsby until the microcomputer shifts to the standby state since the time t6 is Qm_sby=Im(400 [mA])×Tsby(140 [us])=56 [uC], the amount of electric charge that can be supplied while the input side capacitor voltage 203B shifts from Vth_reg(6 [V]) to the operating voltage lower limit Vmv_min=Vmv(3.3 [V])−ΔVmv(0.3[V])=3.0[V] of the microcomputer is Qcin_sply Cin(20 [uF])×(Vth_reg(6.0[V])−Vmv_min(3.0 [V]))=60 [uC]. Since Qcin_sply≥Qm_sby is satisfied, it is found that the electric charge can be supplied at the time of Cin=20 [uF].

In this embodiment, a power supply wiring of the gate voltage regulator circuit 101 is omitted from description. The power supply wiring may be connected so that the electric charge is supplied from any one or both of the positive electrode of the input side capacitor 203 and the positive electrode of the output side capacitor 300.

Also, at a time t8 after arrival of the battery voltage VB, even if the surge voltage is applied to the input side capacitor voltage, and a current flows in the gate terminal through a current path of the gate voltage regulator circuit 101 and a path of the drain to gate capacitor in the n-channel MOSFET 100, an increase in the voltage at the gate terminal is suppressed by the gate voltage holding capacitor 102. As a result, a fluctuation in the output side capacitor voltage is extremely reduced.

In this embodiment, the transistor is exemplified by the n-channel MOSFET 100. However, even if the transistor is a p-channel MOSFET, an npn transistor, a pnp transistor, or the other semiconductor switch elements, the same advantages as those in the first embodiment can be obtained by adjusting a voltage value output by the gate voltage regulator circuit 101 which is the output control circuit of the transistor, or a capacitance setting of the gate voltage holding capacitor 102.

Also, in the series regulator on an electronic control unit for automotive according to this embodiment, a part of the components including the semiconductor components may be incorporated into an integrated circuit such as a custom IC.

Also, the series regulator on an electronic control unit for automotive according to this embodiment is not limited to a single use as the series regulator on an electronic control unit, but may be mounted on the electronic control unit for automotive such as an engine control unit (ECU) or an automatic transmission control unit (ATCU).

As described above, according to this embodiment, the following advantages can be obtained. The output side capacitor capacitance that has been required for supplying an electric power to the microcomputer up to now can be remarkably reduced in a period since the stop processing ready for the subsequent start is started until the microcomputer shifts to the standby state. Even if the surge voltage is applied to the input side capacitor, and the current flows in the gate terminal, an increase in the gate voltage can be suppressed, and a fluctuation of the microcomputer voltage can be suppressed.

Second Embodiment

Figure 3:
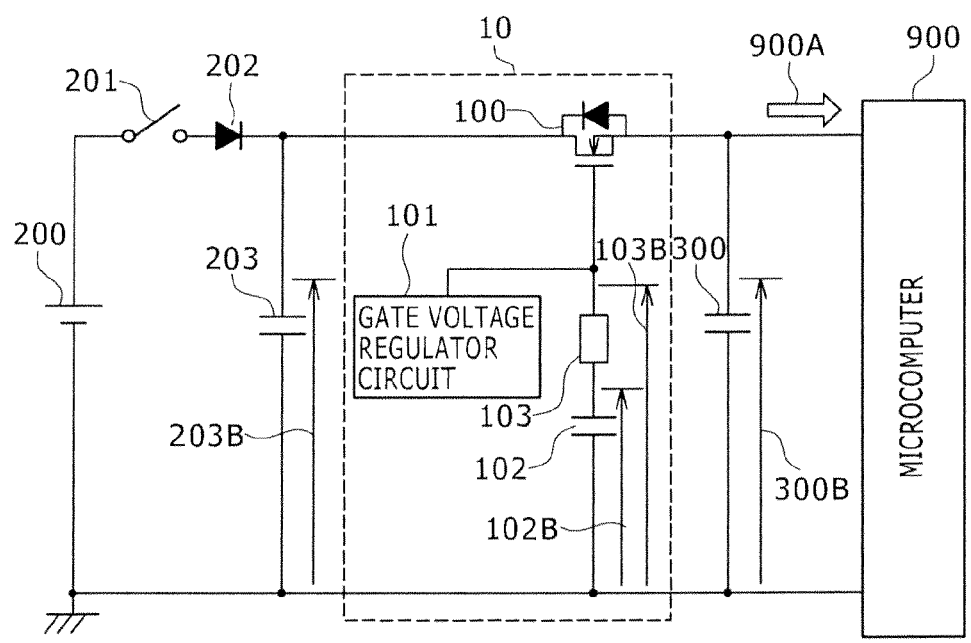
FIG. 3 is a diagram illustrating a series regulator on an electronic control unit for automotive according to a second embodiment.
Figure 4:
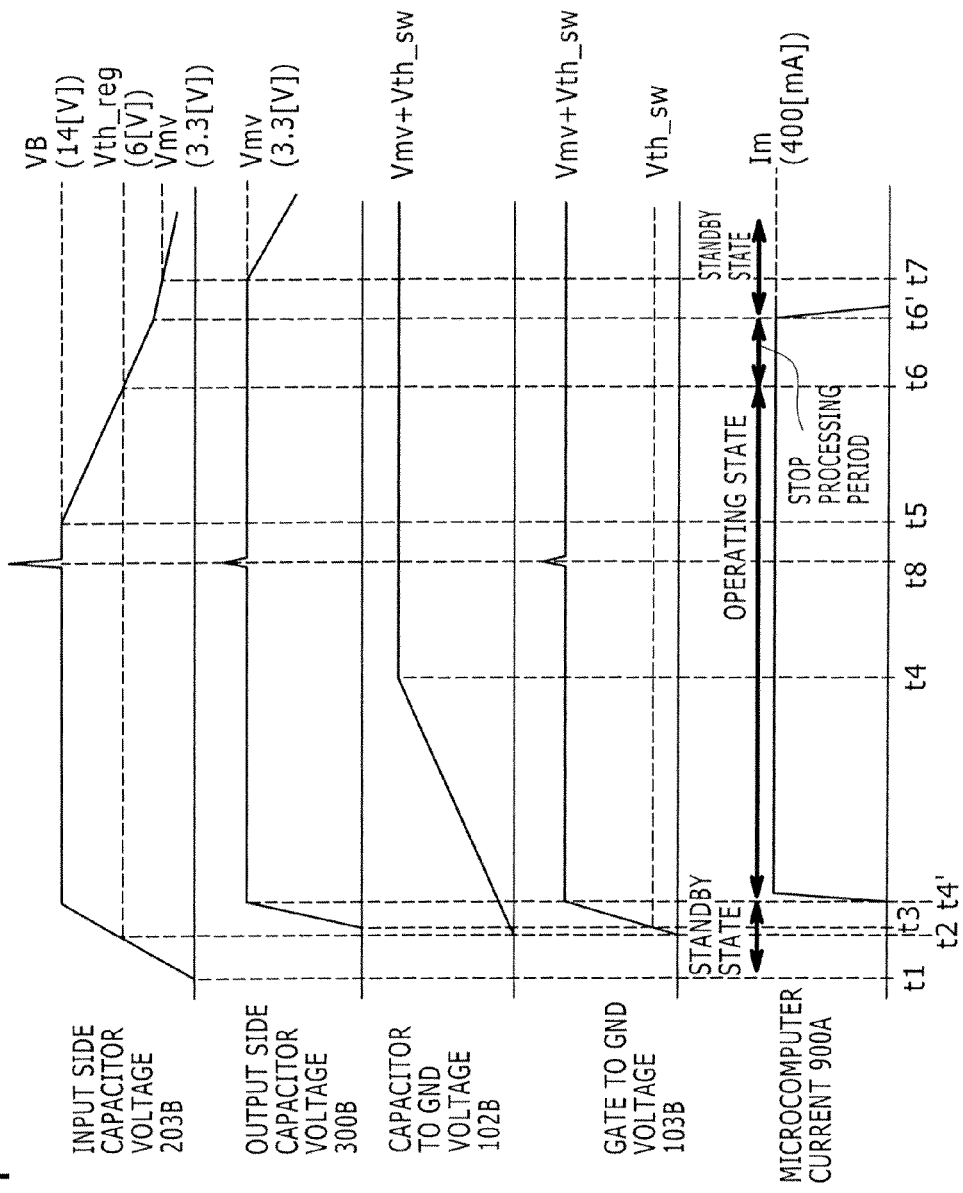
FIG. 4 is a diagram illustrating current and voltage waveforms according to the second embodiment.

Hereinafter, a description will be given in detail of a series regulator on an electronic control unit for automotive according to a second embodiment of the present invention with reference to FIGS. 3 and 4. FIG. 3 is a diagram corresponding to FIG. 1 in the first embodiment. FIG. 4 is a diagram corresponding to FIG. 2 in the first embodiment. The same parts as those in the first embodiment are denoted by identical reference numerals or symbols, and a description thereof will be omitted. Hereinafter, different parts will be described.

The series regulator circuit 10 illustrated in FIG. 3 is different from the series regulator circuit 10 illustrated in FIG. 1 in that a resistor 103 is added. With the provision of the resistor 103, a time required for charging and discharging the capacitance of the gate voltage holding capacitor 102 can be shortened. Also, the series regulator circuit 10 in FIG. 3 is different from that in FIG. 1 in that a backflow check diode 202 is added. Also, a waveform of a resistor 103 to GND voltage 103B is added in FIG. 4.

At a time t1 of FIG. 4, the relay 201 turns on, and the input side capacitor voltage 203B starts to increase. From a time t2 when the input side capacitor voltage 203B exceeds a given voltage value Vth_reg, the gate voltage regulator circuit 101 starts to operate, and the capacitor to GND voltage 102B and the resistor to GND voltage 103B start to increase. When a current for charging the gate voltage holding capacitor 102 flows in the resistor 103, a voltage with the gate terminal side as positive is developed between both ends of the resistor 103. For that reason, the resistor 103 to GND voltage 103B arrives at Vth and Vmv+Vth_sw in a shorter time than that of the capacitor to GND voltage 102B. At a time t4' of FIG. 4 in this embodiment, the resistor 103 to GND voltage 103B arrives at (Vmv+Vth_sw), the output side capacitor voltage 300B arrives at Vmv, and the microcomputer current 900A can start energization. That is, a rising time of the microcomputer can be reduced to the time t4' of FIG. 4 in this embodiment as compared with the time t4 of FIG. 2 in the first embodiment.

Not only the above-mentioned rising time of the microcomputer, but also the response of the resistor 103 to GND voltage 103B to an instruction of the gate voltage regulator circuit 101, and a response of the output side capacitor voltage 300B associated with that response can be enhanced.

At a time 5t and subsequent times, the same advantages as those in the first embodiment are obtained.

Also, a time t8 after arrival of the battery voltage VB, when the surge voltage is applied to the input side capacitor voltage, and a current flows in the gate terminal through a current path of the gate voltage regulator circuit 101 and a path of the drain to gate capacitor in the n-channel MOSFET 100, there is a risk that the resistor 103 to GND voltage 103B increases more than the capacitor to GND voltage in the first embodiment. However, if the output side capacitor voltage is 3.6[V] or lower, which is an upper limit of the operating voltage of the microcomputer, there arises no problem, and the resistor 103 to GND voltage 103B can be adjusted by selection of the resistance value of the resistor 103. Further, with provision of a filter or the like within the gate voltage regulator circuit 101, a response to the surge can be eased up, and the surge resistance can be enhanced. For that reason, measures against that risk can be easily taken.

Also, with the provision of the backflow check diode 202, even when the battery 200 is short-circuited in a state where the relay 201 is on, or a negative voltage surge occurs due to an external load, there is no case in which a current in the input side capacitor 203 is discharged to the battery 200 side. As a result, the series regulator circuit 10 can be stably operated, and even if the battery voltage VB is cut off, an electric power can be supplied to the microcomputer.

Third Embodiment

Figure 5:
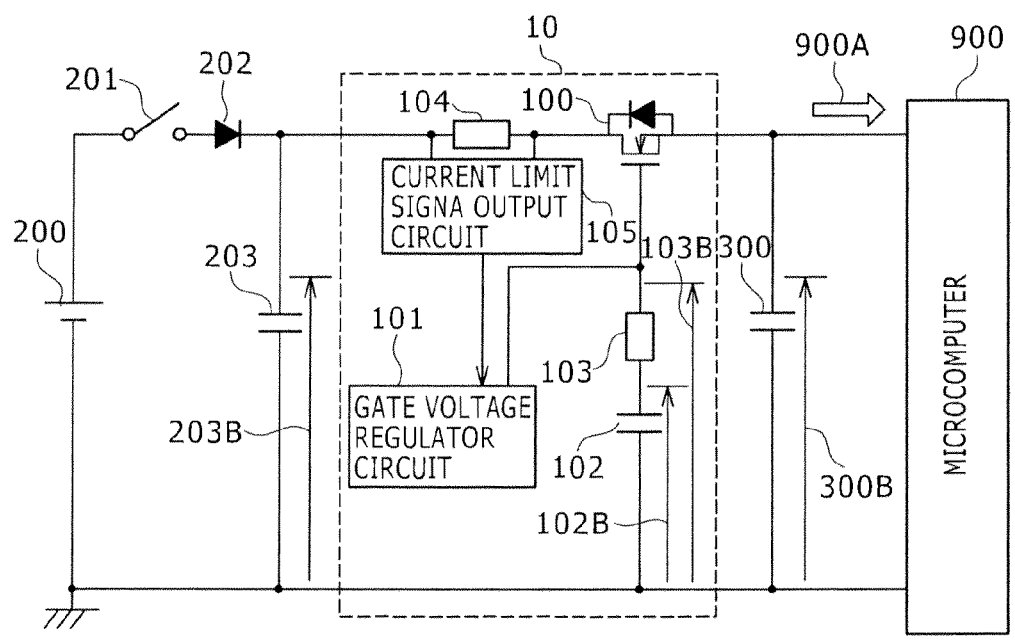
FIG. 5 is a diagram illustrating a series regulator on an electronic control unit for automotive according to a third embodiment.
Figure 6:
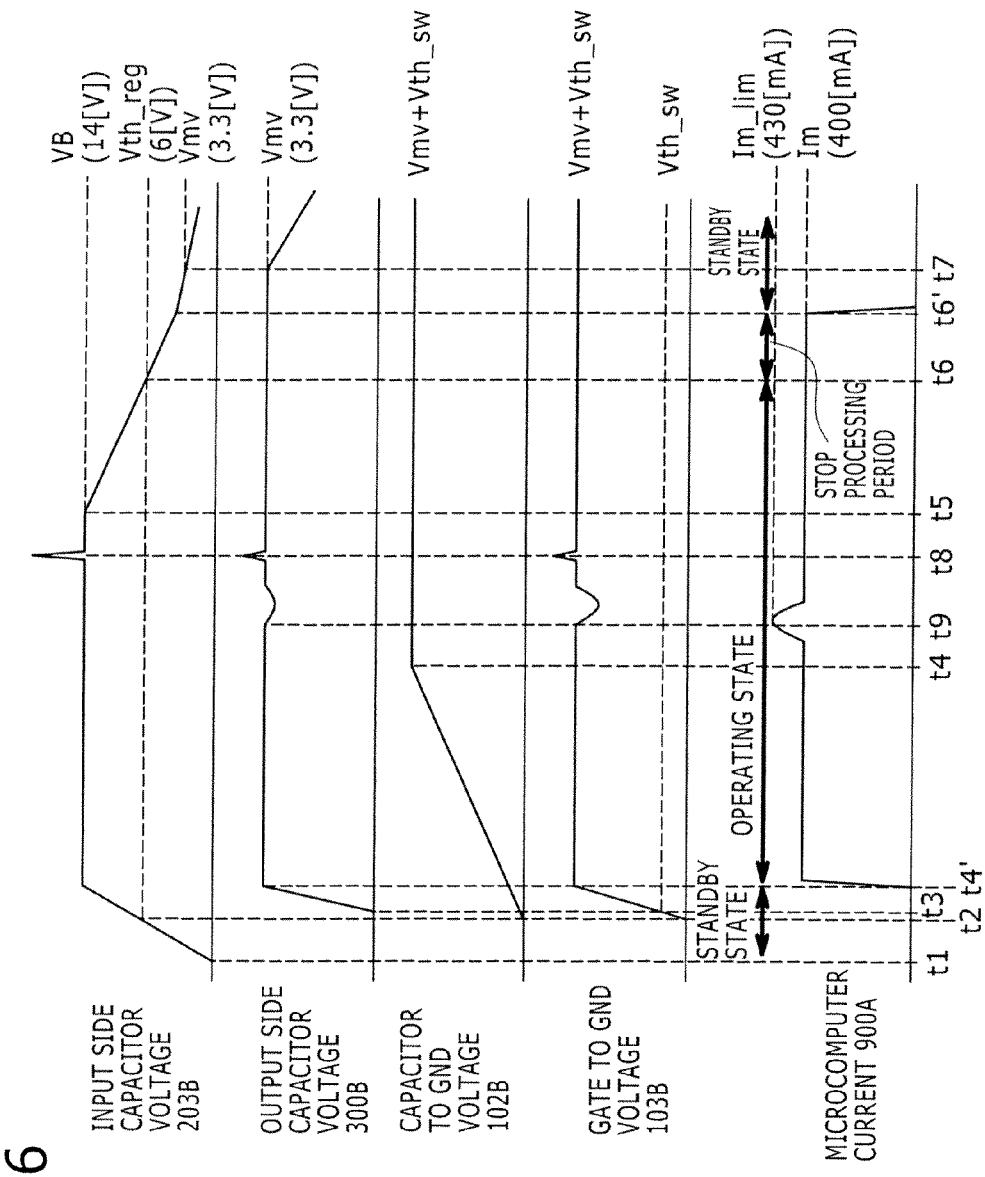
FIG. 6 is a diagram illustrating current and voltage waveforms according to the third embodiment.

Hereinafter, a description will be given in detail of a series regulator on an electronic control unit for automotive according to a third embodiment of the present invention with reference to FIGS. 5 and 6. FIG. 5 is a diagram corresponding to FIG. 3 in the second embodiment. FIG. 6 is a diagram corresponding to FIG. 4 in the second embodiment. The same parts as those in the second embodiment are denoted by identical reference numerals or symbols, and a description thereof will be omitted. Hereinafter, different parts will be described.

The series regulator circuit 10 illustrated in FIG. 5 is different from the series regulator circuit 10 illustrated in FIG. 3 in that a current detection resistor 104 and a current limit signal output circuit 105 are added. The current limit signal output circuit 105 in FIG. 5 monitors a current value by a voltage developed between both ends of the current detection resistor 104. Upon detecting a given current upper limit Im_lim (430 [mA] in this embodiment), the current limit signal output circuit 105 transmits a signal for limiting a current to the gate voltage regulator circuit 101. The gate voltage regulator circuit 101 regulates the gate to GND voltage so as to limit the current flowing in the n-channel MOSFET 100.

At a time t9 in FIG. 6, when the current limit signal output circuit 105 detects the Im_lim, because the microcomputer current 900A is reduced, the resistor 103 to GND voltage 103B is reduced to be lower than (Vmv+Vth_sw) by the output voltage of the gate voltage regulator circuit 101, which is developed on the basis of a signal from the current limit signal output circuit 105. Thereafter, when the microcomputer current 900A returns to a given operating current Im, the gate voltage is controlled to (Vmv+Vth_sw), and the microcomputer becomes an operating state before the energization of Im_lim.

According to the third embodiment, there can be provided the series regulator on an electronic control unit for automotive with higher reliability which can prevent abnormality from occurring on the microcomputer side to cause a flow of overcurrent.

Fourth Embodiment

Figure 7:
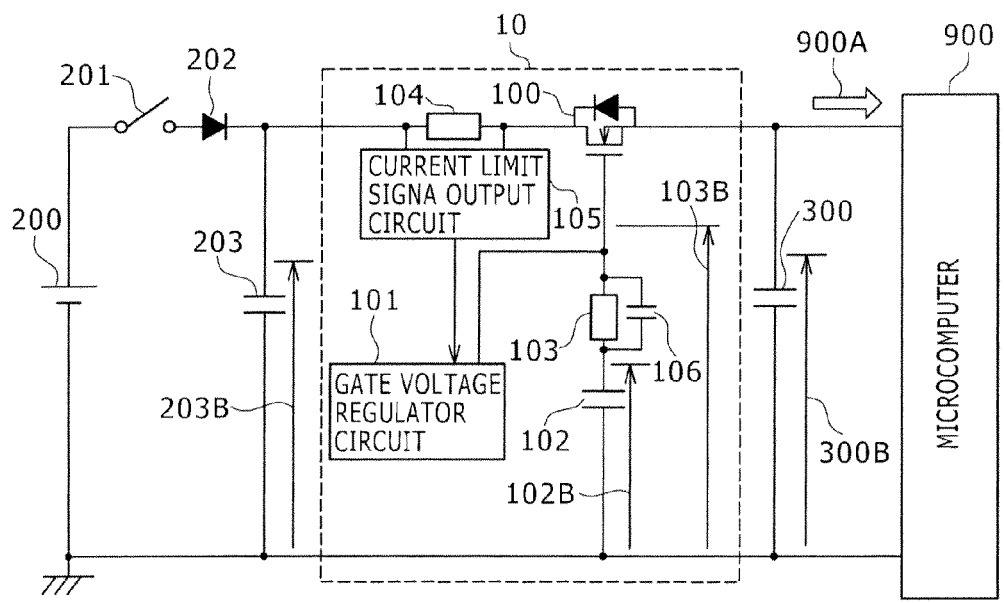
FIG. 7 is a diagram illustrating a series regulator on an electronic control unit for automotive according to a fourth embodiment.
Figure 8:
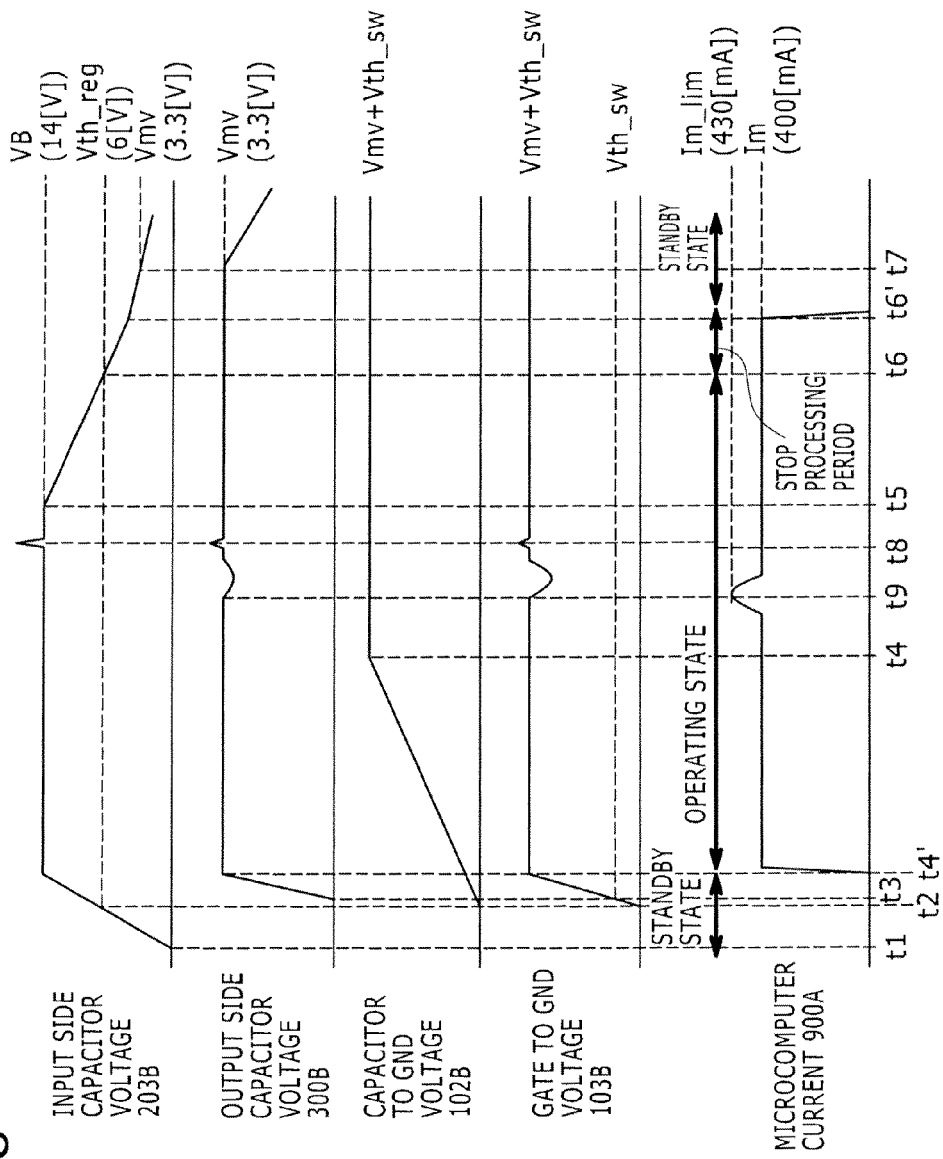
FIG. 8 is a diagram illustrating current and voltage waveforms according to the fourth embodiment.

Hereinafter, a description will be given in detail of a series regulator on an electronic control unit for automotive according to a fourth embodiment of the present invention with reference to FIGS. 7 and 8. FIG. 7 is a diagram corresponding to FIG. 5 in the third embodiment. FIG. 8 is a diagram corresponding to FIG. 6 in the third embodiment. The same parts as those in the third embodiment are denoted by identical reference numerals or symbols, and a description thereof will be omitted. Hereinafter, different parts will be described.

The series regulator circuit 10 illustrated in FIG. 7 is different from the series regulator circuit 10 illustrated in FIG. 5 in that a capacitor 106 is added. In this embodiment, it is assumed that the capacitor 106 has a capacitance of about 10 [nF].

Also, at a time t8 after the arrival of the battery voltage VB, even when the surge voltage is applied to the input side capacitor voltage, and a current flows into the gate terminal through a current path of the gate voltage regulator circuit 101 and a path of the drain to gate capacitance in the n-channel MOSFET 100, because the capacitor 106 having a capacitance that can absorb the amount of electric charge associated with that current is provided, the voltage developed between both ends of the resistor 103 is smaller than the voltage developed between both ends of the resistor 103 in FIG. 5 in the third embodiment. For that reason, a resistance to the surge can be enhanced.

The provision of the capacitor 106 in this embodiment is effective particularly in a case where the measures such as the adjustment of the resistance value of the resistor 103 in the third embodiment or the provision of the filter within the gate voltage regulator circuit 101 are insufficient as the surge measures.

According to the fourth embodiment, there can be provided the series regulator on an electronic control unit for automotive which is high in the operation reliability of the surge voltage to the input side capacitor.

Fifth Embodiment

Figure 9:
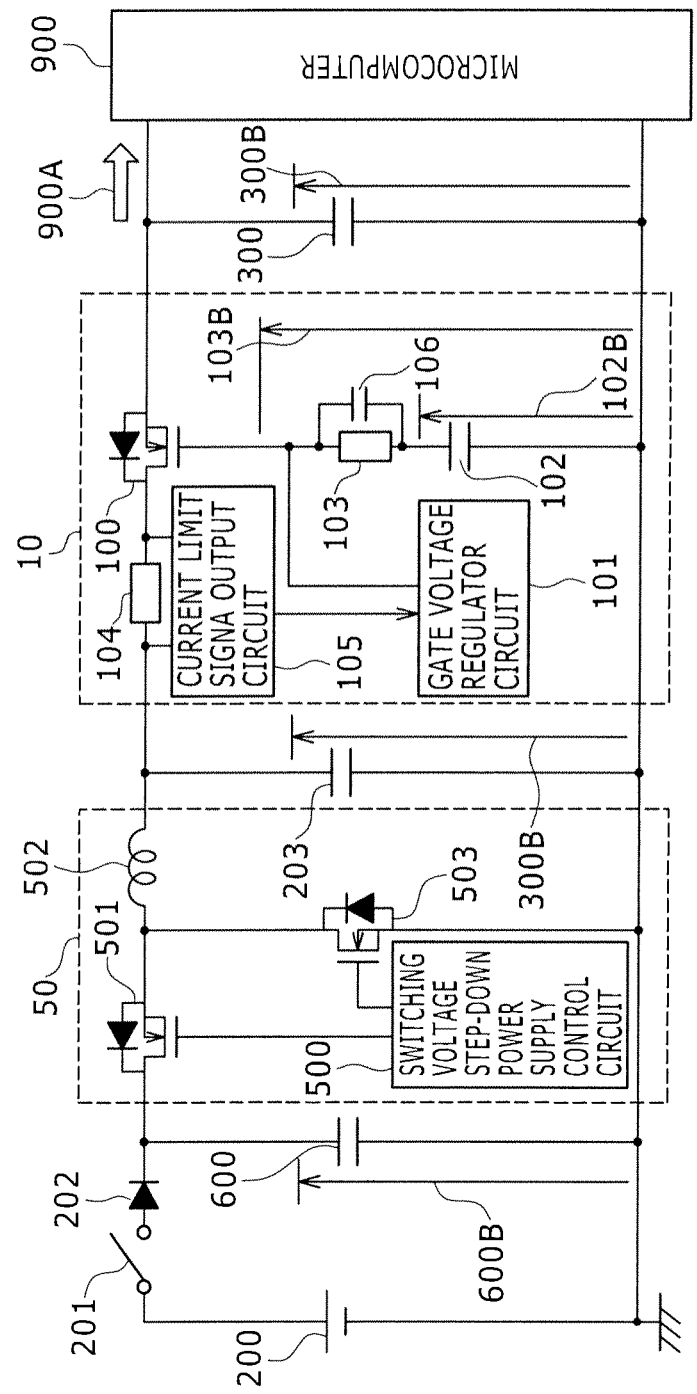
FIG. 9 is a diagram illustrating a series regulator on an electronic control unit for automotive according to a fifth embodiment.
Figure 10:
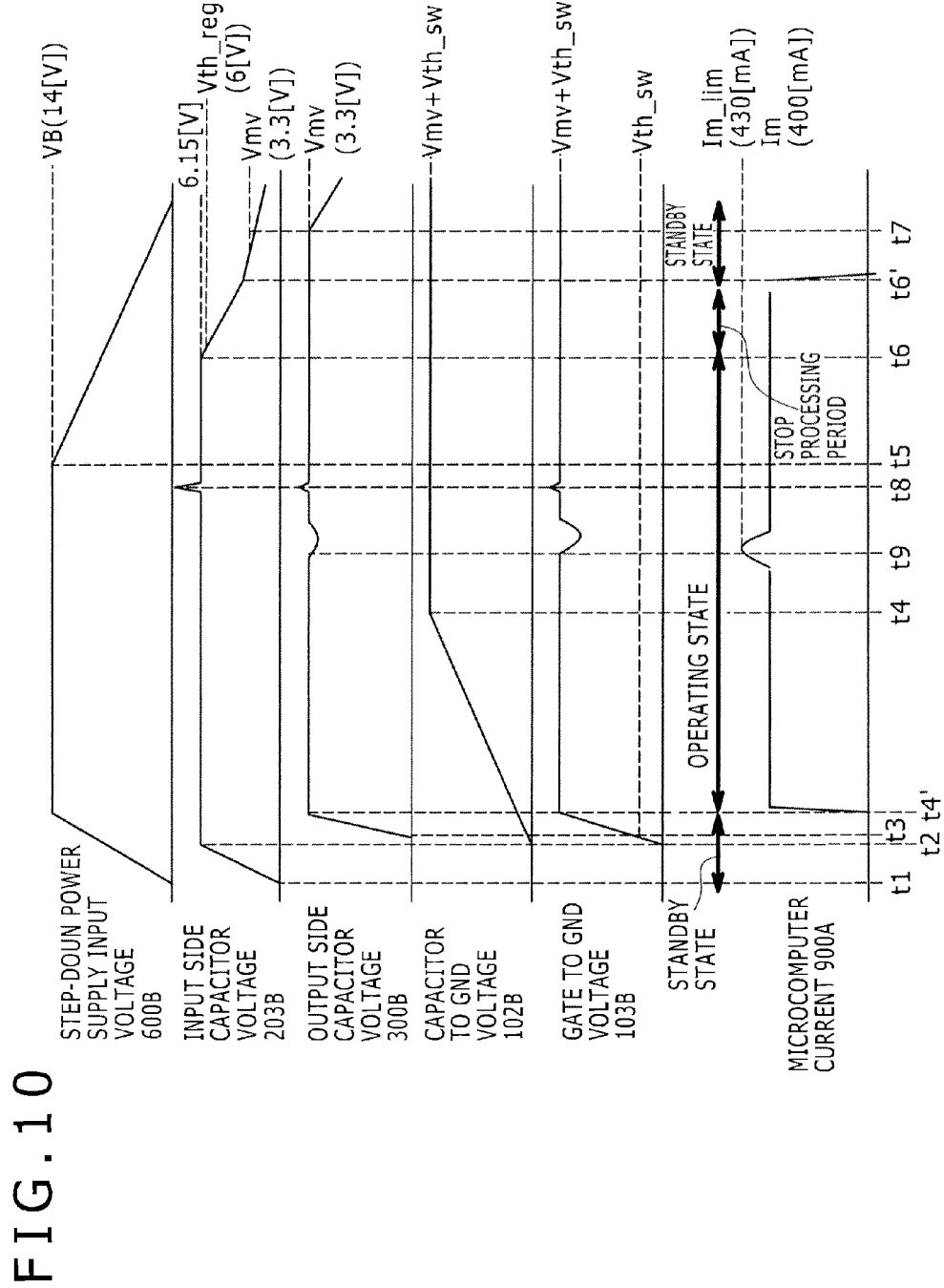
FIG. 10 is a diagram illustrating current and voltage waveforms according to the fifth embodiment.

Hereinafter, a description will be given in detail of a series regulator on an electronic control unit for automotive according to a fifth embodiment of the present invention with reference to FIGS. 9 and 10. FIG. 9 is a diagram corresponding to FIG. 7 in the fourth embodiment. FIG. 10 is a diagram corresponding to FIG. 8 in the fourth embodiment. The same parts as those in the fourth embodiment are denoted by identical reference numerals or symbols, and a description thereof will be omitted. Hereinafter, different parts will be described.

The circuit configuration of FIG. 9 is different from that of FIG. 7 in that a voltage step-down power supply 50 and a voltage step-down power supply input side capacitor 600 are added. The voltage step-down power supply 50 includes a main FET 501, an inductor 502, a synchronous FET 503, and a switching voltage step-down power supply control circuit 500. The voltage step-down power supply 50 steps down a voltage step-down input voltage 600B (14[V] in this embodiment) to the input side capacitor voltage 203B (6[V] in this embodiment). In this embodiment, the synchronous FET 503 is provided as a circuit for synchronous rectification. Alternatively, even if the synchronous FET 503 is replaced with a diode rectification using a diode, the same advantages can be obtained.

Also, the circuit configuration of FIG. 9 is different from that of FIG. 7 in that a waveform of the voltage step-down input voltage 600B illustrated in FIG. 10 is added.

At a time t1 of FIG. 10, the relay 201 turns on, and the voltage step-down input voltage 600B and the input side capacitor voltage 203B starts to increase. From a time when the input side capacitor voltage 203B arrives at 6.15[V], the voltage step-down power supply 50 starts to operate, and even if the voltage step-down input voltage 600B becomes 6.15[V] or higher, an input side capacitor voltage 205B is held to 6[V].

As a result, the voltage drop applied to the n-channel MOSFET 100 in the series regulator circuit 10 during a microcomputer operating period becomes 2.85[V] (=6.15−3.3[V]). The voltage drop is smaller by about 73% than the voltage drop 10.7[V] (=14−3.3[V]) applied to the n-channel MOSFET 100 in FIG. 8 of the fourth embodiment. For that reason, if the microcomputer current is equal, a loss of the n-channel MOSFET 100 can be reduced by about 73%. That is, the high efficiency is enabled.

Sixth Embodiment

Hereinafter, a description will be given in detail of a series regulator on an electronic control unit for automotive according to a sixth embodiment of the present invention with reference to FIG. 11. In general, an electrolytic capacitor includes an explosion-proof valve for preventing burst when a temperature rises. When resin sealing is conducted for mounting, the explosion-proof valve is covered to making it difficult to ensure the safety. As a result, the electrolytic capacitor cannot be used.

According to the first to fifth embodiments, the electrolytic capacitor that has been used as the output side capacitor of the series regulator up to now can be replaced with a ceramic capacitor. For that reason, mounting with resin sealing can be conducted. If resin sealing is enabled, the semiconductor components can be mounted on a bare chip, and downsizing can be performed.

Figure 11:
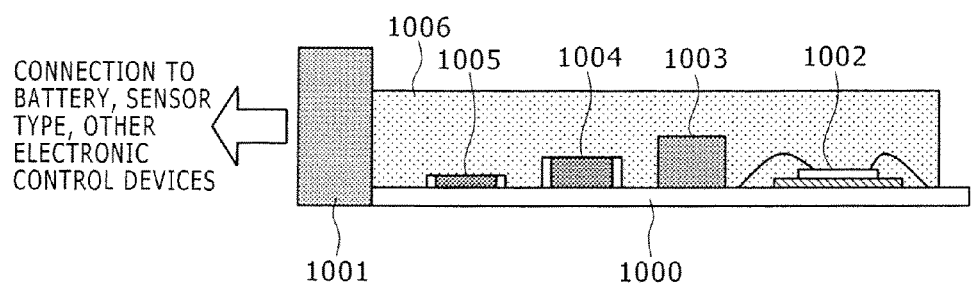
FIG. 11 is a diagram illustrating a series regulator on an electronic control unit for automotive according to a sixth embodiment.

FIG. 11 illustrates a mounting example of the first to fourth embodiments. A semiconductor component 1002, a surface mount inductor 1003, a ceramic capacitor 1004, a chip resistor 1005, and a connector 1001 are mounted on a metal base substrate 1000 having a wiring pattern formed thereon, and then sealed with a resin 1006. Those components are connected to a battery, a sensor type, and other electronic control units through a connector 1001.

In FIG. 11, the respective representatives of the resistive elements, the capacitor components, the inductor components, and the semiconductor components are illustrated one by one. In fact, a plurality of components may be mounted.

Also, the ceramic capacitor 1004 may be replaced with a capacitor requiring no explosion-proof valve. The metal base substrate 100 may be configured by a substrate such as a ceramic substrate or a multilayer printed wiring board.

With the above mounting structure, there can be provided the downsized series regulator on an electronic control unit for automotive and electronic control unit for automotive.

As has been described above, according to the present invention, the following advantages can be expected.

(1) The microcomputer voltage can be held after the battery is cut off.

(2) The capacitance of the capacitor connected to the microcomputer voltage wiring can be reduced.

(3) The microcomputer voltage can be held even when the battery is short-circuited.

(4) The rising time and response of the microcomputer can be improved.

(5) The overcurrent protection can be executed at a high speed.

(6) The surge resistance can be improved.

(7) The electronic control unit for automotive can be downsized by a reduction in the electrolytic capacitor.

(8) The series regulator on an electronic control unit for automotive and the electronic control unit for automotive can be downsized by resin sealing mounting.

What is claimed is:

1. A series regulator on an electronic control unit for an automotive vehicle which is connected to an in-vehicle power supply for supplying a voltage to a microcomputer, the series regulator comprising:
   a first capacitor that has one end connected to a positive electrode of the in-vehicle power supply and the other end connected to a negative electrode of the in-vehicle power supply;
   a second capacitor that has one end connected to an input terminal of the microcomputer and the other end connected to the negative electrode of the in-vehicle power supply;
   a transistor that has an input terminal connected to the one end of the first capacitor and an output terminal connected to the input terminal of the microcomputer;
   a resistive element that has one end connected to an output control terminal of the transistor;
   a third capacitor that has one end connected to the other end of the resistive element and the other end connected to the negative electrode of the in-vehicle power supply; and
   an output control circuit that has an output connected between the output control terminal of the transistor and the resistive element, and controls driving of the transistor, wherein:
   the microcomputer includes a stop processor that stores information required for a subsequent start when a voltage applied between both ends of the first capacitor falls below a given voltage,
   wherein the transistor is a field-effect transistor (FET), and the third capacitor is connected in series to a gate of the transistor.

2. The series regulator on an electronic control unit for an automotive vehicle according to claim 1, wherein the transistor is an n-channel MOSFET having a drain terminal as the input terminal, a source terminal as the output terminal, and a gate terminal as the output control terminal.

3. The series regulator on an electronic control unit for an automotive vehicle according to claim 1, further comprising:
   a diode that is connected in series between the positive electrode of the in-vehicle power supply and the one end of the first capacitor,
   wherein an anode of the diode is connected to the positive electrode of the in-vehicle power supply, and a cathode of the diode is connected to the positive electrode of the first capacitor.

4. The series regulator on an electronic control unit for an automotive vehicle according to claim 1, further comprising:
   a fourth capacitor that is connected in parallel to the resistive element,
   wherein a positive electrode of the fourth capacitor is connected to one end of the resistive element, and a negative electrode of the fourth capacitor is connected to the other end of the resistive element.

5. The series regulator on an electronic control unit for an automotive vehicle according claim 1, further comprising: a current limit signal output circuit that has an output connected to an output control terminal of the transistor.

6. The series regulator on an electronic control unit for an automotive vehicle according to claim 1, further comprising:
   a switching regulator that is disposed between the in-vehicle power supply and the first capacitor,
   wherein the in-vehicle power supply includes a battery and a relay switch,
   wherein the relay switch is connected to the positive electrode of the battery, an input terminal of the switching regulator is connected to the positive electrode of the in-vehicle power supply, an output terminal of the switching regulator is connected to the positive electrode of the first capacitor, and
   wherein the switching regulator drops a battery voltage output by the battery into an intermediate voltage.

7. The series regulator on an electronic control unit for an automotive vehicle according to claim 1, further comprising a semiconductor integrated circuit, wherein at least a part of the output control circuit of the series regulator is incorporated into the semiconductor integrated circuit.

8. An electronic control unit for an automotive vehicle, comprising:
   the series regulator on an electronic control unit for an automotive vehicle according to claim 1; and
   the microcomputer.

9. The electronic control unit for an automotive vehicle according to claim 8, wherein at least a part of the circuit is sealed with resin.

* * * * *